United States Patent
Hinks (10) Patent No.: US 6,834,998 B2
(45) Date of Patent: Dec. 28, 2004

(54) SHAFT BEARING-SEAL ASSEMBLY PENETRATING THE WALL OF A PRESSURE VESSEL

(76) Inventor: William Lloyd Hinks, 2449 Kensington Ave., Akron, OH (US) 44333

(*) Notice: Subject to any disclaimer, the term of this patent is extended or adjusted under 35 U.S.C. 154(b) by 0 days.

(21) Appl. No.: 10/346,872

(22) Filed: Jan. 17, 2003

(65) Prior Publication Data

US 2003/0179964 A1 Sep. 25, 2003

Related U.S. Application Data

(62) Division of application No. 09/522,219, filed on Mar. 9, 2000, now Pat. No. 6,524,007.

(51) Int. Cl.[7] .............................................. F16C 27/06
(52) U.S. Cl. ....................... 384/138; 384/221; 277/602; 277/606; 277/624
(58) Field of Search .......................... 74/17.8; 384/152, 384/153, 215, 221, 222, 228, 138, 224, 235; 277/510, 511, 540, 602, 606, 616, 619, 624, 627, 608, 654

(56) References Cited

U.S. PATENT DOCUMENTS

| | | | | |
|---|---|---|---|---|
| 1,971,169 A | * | 8/1934 | Wheeler ..................... | 384/149 |
| 2,900,182 A | * | 8/1959 | Hinks ......................... | 267/282 |
| 3,083,065 A | | 3/1963 | Hinks | |
| 3,228,673 A | | 1/1966 | Hinks | |
| 3,504,902 A | | 4/1970 | Irwin | |
| 3,504,903 A | | 4/1970 | Irwin | |
| 3,504,904 A | | 4/1970 | Irwin et al. | |
| 3,532,174 A | | 10/1970 | Diamantides et al. | |
| 3,610,347 A | | 10/1971 | Diamantides et al. | |
| 3,680,895 A | * | 8/1972 | Herbert et al. ........... | 285/146.3 |
| 3,734,546 A | | 5/1973 | Herbert et al. | |
| 4,068,864 A | | 1/1978 | Herbert et al. | |
| 4,068,868 A | | 1/1978 | Ohrt | |
| 4,076,284 A | | 2/1978 | Herbert et al. | |
| 4,111,435 A | * | 9/1978 | Vilain ........................ | 29/252 |
| 4,236,737 A | * | 12/1980 | Herbert et al. ............. | 285/234 |
| 4,291,925 A | * | 9/1981 | Peterson et al. ........... | 384/221 |
| 4,435,097 A | * | 3/1984 | Peterson .................... | 384/221 |
| 4,438,957 A | * | 3/1984 | Williams et al. ........... | 285/223 |

FOREIGN PATENT DOCUMENTS

| | | | |
|---|---|---|---|
| DE | 2331383 | * | 1/1974 |
| JP | 59-197615 | * | 11/1984 |

* cited by examiner

Primary Examiner—William C. Joyce (57) ABSTRACT

A rubber laminated bearing-seal, consisting of multiple flat or curved alternate laminations of metal and rubber bonded together and having an aperture, is seated in an apertured receptacle in the wall of a pressure vessel and supports a shaft that penetrates the apertures, extending from one side of the wall through to the other side. Shear strains in the rubber laminations permit the shaft to carry limited movements through the wall while the laminations seal against any flow of the liquid or gaseous medium on one side toward the other side and withstand the resulting thrust caused by large pressure differences. The torque reaction of this bearing-seal is essentially proportional to rotation angle. A potential use is in the intense hydrostatic pressure environment of undersea applications at great depths, carrying limited motion through the hull of a submersible craft.

18 Claims, 5 Drawing Sheets

SHAFT BEARING-SEAL ASSEMBLY PENETRATING THE WALL OF A PRESSURE VESSEL

This is a divisional of application Ser. No. 09/522,219, filed Mar. 9, 2000, now U.S. Pat. No. 6,524,007.

BACKGROUND OF THE INVENTION

The field of the invention relates to rubber laminated bearings used to support and seal a limited-movement shaft that penetrates the wall of a pressure vessel.

In the prior art, rubber-laminated bearings as disclosed in U.S. Pat. No. 2,900,182, include multiple alternate laminations of metal (or other strong inextensible material) and rubber (or generally any elastomer) bonded together, the rubber layers in particular being thin relative to their width and/or of relatively stiff composition. Lateral motions between succeeding metal laminations are permitted by shearing action within and parallel to the intervening rubber laminations, while the stack of laminations so-formed can often sustain very high normal forces (eg, 20,000 psi or more) with very slight compression because of negligible extrusion of rubber out from between the metal laminations. They can be made with laminations in any shape, with apertures or not, and with various cross-sectional configurations, including truncated planar, conical, spherical, chevron-shaped or cylindrical layers. Often, to provide complete practical bearings, thicker layers of metal are bonded on the outsides to the underlying laminates as described, forming external layers that are load faces. These two outer layers may be shaped to conform with and to seal with respect to mating members and to provide for keying to the latter for orientation and prevention of slipping.

When the external load faces of such a bearing are interposed between complementally-contoured and opposed loading members, it can resist thrust, radial or combined forces normal to its layers, depending upon its configuration. Relative lateral movement between the opposed loading members, which may include pivoting about a normal axis as well as transverse or lateral shifting, results in a distribution of the aforesaid shearing movements between individual rubber layers. These relative motions are accompanied by opposing forces proportional to their extent, caused by shear stress in the rubber laminations.

An additional property of such a load-bearing laminate stack that contains one or more apertures is the capability of sealing the space occupied by the laminations between the opposing members against the lateral or transverse flow of fluids, ie, liquids or gases, between the periphery of the laminate stack and an aperture, and making them essentially impervious even under substantial differential pressure. This is shown in U.S. Pat. Nos. 3,532,174 and 3,610,347, where such bearings for a vibratory drill mechanism were sealed against drilling fluid and were indicated to be of cylindrical (ie, radially loaded) or acute-angled conical (combined loading) configurations. U.S. Pat. Nos. 3,734,546, 4,068,864, 4,068,868, 4,076,284 and others typically show spherically-configured rubber laminate bearings used to seal the joints of submerged oilfield pipe sections while permitting flexibility between them. Further, U.S. Pat. Nos. 3,504,902/3/4 show spherical rubber laminated bearings used in the throat of rocket nozzles to permit control of the thrust vector by tilting the nozzle, while sealing against the lateral escape of the hot gasses.

None of these laminated bearing references were found to provide for sealing a shaft that penetrates the wall of a pressure vessel so that motions applied on one side may be carried to the other to accomplish some purpose. Indeed, all of the patents cited in the previous paragraph are functionally dependent upon a free path for fluid flow through the pipe or nozzle that is surrounded by the bearing-seal that is employed. If their pipe or channel for fluid flow were to be considered a shaft with a longitudinal hole through it, that hole would completely invalidate the present purpose, which involves preventing any such flow from one side to the other of the wall through which the shaft passes.

Existing methods of providing the desired sealing function for a shaft penetrating the wall of a pressure vessel employ a lip seal or face seal, conventional though designed for high pressure, that slides on the surface of the shaft or on a flanged part of it. All such methods must contend with friction torque, all the greater under conditions of extreme pressure even when anti-friction materials such as reinforced tetrafluoroethylene are used. Moreover, because sliding on a surface is involved, its smoothness must be assured and care must be taken to prevent ingress of foreign material or objects that could not only cause rapid wear but could damage the sealing integrity of the seal or shaft surfaces.

BRIEF SUMMARY OF THE INVENTION

In this invention, one of the loading members is an enlarged contoured enlargement or flange at the midsection of a shaft, ie, between its ends, against one or both sides of which enlargement or flange there is seated a complementally-contoured or conforming rubber-laminated bearing-seal having an aperture as described. The shaft extends through a bearing aperture and on through an aperture in a bearing housing or receptacle part of the wall of a pressure vessel. This housing or receptacle comprises a radially inward load-supporting seat or appropriately contoured annular flange against which said bearing-seal is seated, ie, the other loading member of said bearing-seal is part of or connected to the wall. The wall separates two liquid, gaseous or even vacuous media, all considered as fluids herein. The nested laminations or layers of said bearing-seal may be surfaces of revolution about an axis that corresponds to the shaft axis. Hence, the shaft can carry limited movements, rotational or lateral and parallel to the laminations, from one side to the other of the wall while being sealed against any fluid flow between the sides despite substantial pressure differences, and while resisting the resulting thrust. The force or torque reaction is negligible due to friction and small with small movement compared with the relatively high friction of conventional sealing methods.

The reasons for penetrating the wall of a pressure vessel with a sealed movable shaft generally dictate that some functional mechanism be provided at each end of the shaft, coupled with it to impart or receive torque or force and motion to it. Thus, one potential use is in the intense hydrostatic pressure environment of undersea applications at great depths, carrying limited or oscillatory motion through the hull of a manned or robotic submarine craft. Failure to provide the expected sealing effect could be catastrophic. Backup using a second laminated bearing-seal or conventional O-ring seals or their functional equivalent in series can be used for protection against such events.

It is an object of the invention to provide a new means with very low friction and reliable long life for sealing a limited motion shaft that penetrates the wall of a pressure vessel to accomplish some purpose.

DETAILED DESCRIPTION OF THE INVENTION

In the following disclosure and claims, the terms "top", "bottom", "up", and "down", etc. are used for convenience only and refer in actuality only to the relative position of parts of the assembly, particularly as they appear in the figures, whereas it should be understood that any orientation of the assembly is possible in practice. "Top" as used here generally corresponds to the high pressure side of the wall of a pressure vessel, and "bottom" the low pressure side.

Figure 1:
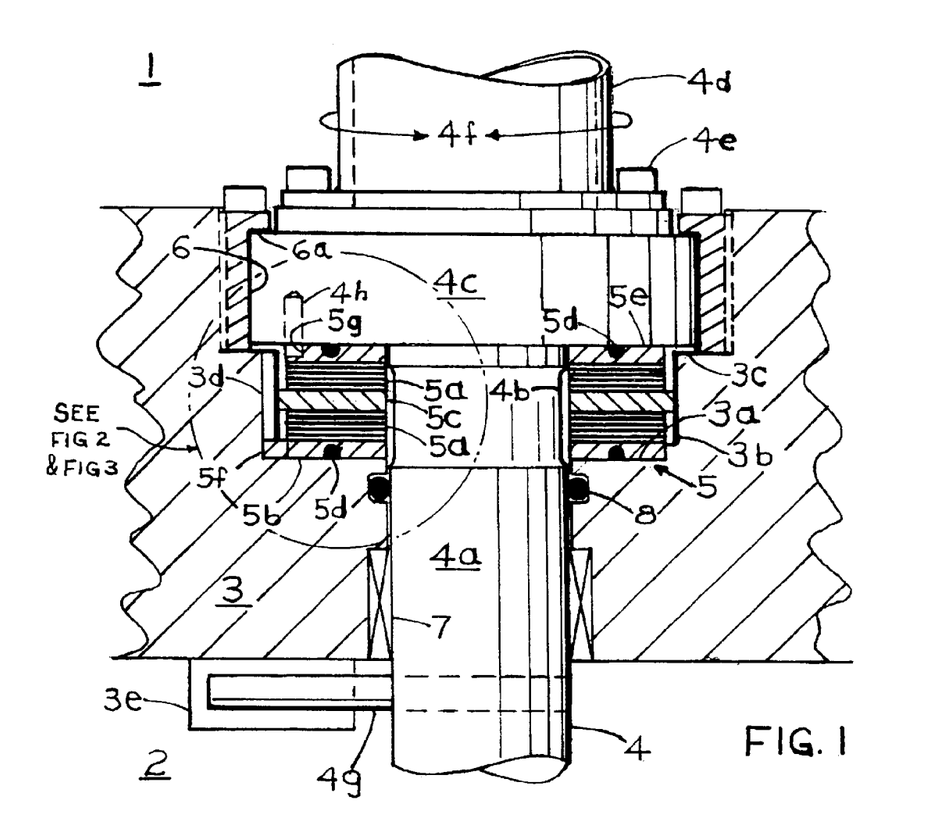
FIG. 1 is a cross-section of a flat-configured bearing-seal assembly according to the invention.

FIG. 1 is a cross-section (except shaft 4) of such a laminated bearing-seal with a circular and annular flat or planar-layered configuration, capable of permitting rotational movement 4f while withstanding the thrust loads and external radially-inward compressive loads caused by hydrostatic pressure. Higher- and lower-pressure fluid media, 1 and 2 respectively, are situated on opposite sides of the wall or hull 3 of a pressurized vessel. The wall incorporates a bearing housing for admission of the shaft 4 and the laminated bearing-seal 5 that encircles the shaft and includes one or more stacks 5a of washer-like rubber and metal laminations. The housing is shown with a circular cavity enveloping the bearing-seal and a recess or receptacle 3a engaging the load face of its bottom outer layer member (ie, its second load-face), the washer or end plate 5b. Said receptacle 3a constitutes one of the loading members on bearing-seal 5. It would obviously not be essential that receptacle 3a be at the bottom of a cavity surrounding the bearing-seal to be effective; the receptacle could instead be on the top surface of the wall 3, for instance. The shaft has a larger-diameter circular flange 4c in its mid-section with a flat-bottomed face that engages the load face of the top end plate 5e of the bearing-seal (ie, the latter's first load-face) and thereby provides the other loading member.

Unless the gaps between the top and bottom end plates 5e and 5b and their mating load members are effectively sealed by direct bonding, some other means of sealing between them must be provided. To do so here, the end plates 5e and 5b are both shown with aperture-encircling grooves in their load faces to accomodate O-rings 5d or functionally-equivalent sealing rings of other cross-sectional shapes than circular, eg, lip seals. With the bearing-seal itself, these seals complete the overall sealing function between the engaging loading members, ie, between the recess 3a and the flange section 4c, and thus between the wall 3 and the shaft 4.

Figure 2:
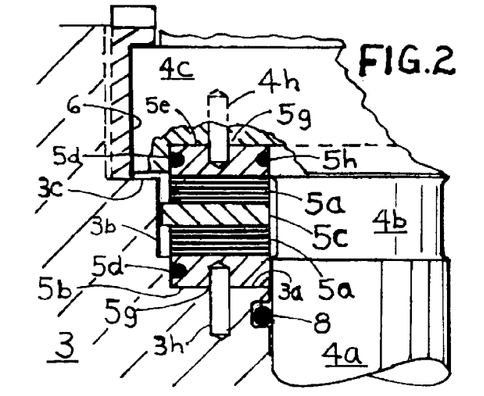
FIG. 2 is an alternate construction of an encircled part of FIG. 1.

Other possible relative locations of such conventional encircling seals between the mating members are evident. FIG. 2 depicts such a case as an alternate construction of an encircled part of FIG. 1, showing the left cross-section of the symmetric bearing-seal and its mating parts. The seals 5d reside in annular grooves between the diametral outsides of the end plates 5b and 5e and the bores of the cavity and of an annular recess in the downward extended bottom of the flange 4c, respectively. Flange 4c is shown partially sectioned for clarity. The top seal could instead or in addition have been placed between a groove at the inside diameter of the end plate 5e and the outside diameter of the shaft 4, as indicated by 5h.

The bearing-seal of FIG. 1 or 2 may also include some means of lateral support or restraint against columnar deflection, if needed, such as taught in U.S. Pat. No. 3,228,673. According to one such method, at least one interposed flat washer plate 5c forms a thick intermediate lamination or layer that extends radially beyond the outside diameter of the other laminations. Its outside diameter provides a smooth circular surface engaged to slide within the cylindrical cavity of wall 3. The latter may be lined for that purpose with a suitable thin low-friction sleeve 3b made of a bearing material such as reinforced TFE which is adequate for the small motion and minimal radial force that might be reacted. Alternatively, such lateral support could be provided by extension of the plate(s) inwardly to bear upon the shaft 4 surface, appropriately lined. As shown, however, the shaft at 4b is relieved slightly to prevent the laminations from rubbing it directly.

Shaft 4 is maintained in a centered position relative to the housing by radial bearing (eg, needle) or bushing means 6 or 7 at the locations 4c or 4a above or below bearing-seal 5, or both. Item 6 in particular indicates a sleeve-bushing having a shoulder flange 6a. It is screwed and locked (not shown) in place so that flange 6a has a slight axial clearance gap from shaft flange 4c and functions as a positive retainer to prevent inadvertent axially-upward movement of shaft 4. (Such a restraint might otherwise be applied on the shaft by means located on the bottom side of the wall.) Large radial clearances of items 6 and 7 would permit limited cross-axis or lateral translation of shaft 4 should that be desired. Primarily however, limited circular motions of the shaft as indicated by 4f will be carried through the wall 3 of the pressure vessel. Instead of extending axially directly, a shaft extension 4d, secured by breakable bolts 4e or other means, could be employed to provide protection against inadvertent external side overloads that might otherwise endanger the integrity of the sealing function. Collapsible means (not shown) could also be provided on the top side of the shaft to prevent downward axial overloads. A breakable extension might be desirable on the opposite end of the shaft as well.

Positive mechanical stops to limit the extent of angular travel of the shaft to safe maxima are also indicated. In one of many possible ways, the cross-axis pin 4g is affixed in a hole drilled through the shaft 4 to create a lever arm that operates freely in an angular range defined by the positioning of two stops 3e (only one shown, partially occluded by the pin). The angular orientation of these stops relative to the pin would typically be chosen with the halfway point between the stops corresponding to the untorqued position of the bearing-seal.

The orientation of these stops operates in conjunction with the bearing-seal end faces 5b and 5e being keyed or tabbed against torsional slippage between the shaft and the wall. The method shown in FIG. 1 comprises a tab-like key 5f as part of the bottom end plate 5b, extending radially outward from it into a key slot 3d cut axially into the bearing housing, while the shaft is keyed to the top end plate 5e by a pin 4h permanently fitted into a hole in the bottom of the flange 4c and projecting downwards into a loose-fitting hole 5g partway through the top end plate 5e near the edge. Such keying will ensure that the torsional spring action of the bearing will return it to the initial position when untorqued. In FIG. 2, pins 4h and 3h project into holes 5g on the top and bottom end plates respectively. In general, keys or tabs interlocked with slots and pins interlocked with holes are examples of complemental interlocking mechanisms that relatively restrain the associated parts. Some kind of relative restraint method is assumed to be available as well in the later configurations that will be presented even if not actually shown in the figures, including the possibility that a bearing-seal is directly bonded to a mating load member.

Failure of the bearing-seal's sealing function should be quite unlikely with proper design, but for a potentially critical application, backup protection may be deemed essential. A secondary seal 8 is provided by an O-ring as shown, or a suitable lip or face seal, or some other functionally equivalent means encircling the shaft in the conventional manner to block flow of the high-pressure fluid 1 past it in case of such failure. It would ordinarily be relieved of differential pressure by the bearing-seal and therefore a minor source of friction torque.

Furthermore, failure by axial collapse of the bearing-seal, though very unlikely, could be limited by a physical stop. An annular land or shoulder part 3c of the bearing housing is provided by making its diameter and the cooperating diameter of shaft flange-section 4c larger than that of sleeve 3b, while the thickness of the axial clearance gap at 3c between the flange-section 4c and the land is made relatively small. Any downward axial movement of shaft 4 as a consequence of such failure would then be limited by that gap dimension. Although frictional torque on the shaft might be high with the secondary seal called into action, or the shaft even completely immobilized by partial axial collapse, protection against catastrophic fluid flow would be provided.

Consideration of the forces and internal stresses in such a bearing-seal configuration shows that its average static compressive stress Sc due to the downward thrust force induced by differential (high minus low) pressure p is approximately $Sc = p(Do^2/(Do^2-Di^2))$, where Do and Di are the outside and inside diameters of the laminations and relatively small pressure on the bottom side is ignored. Shear stresses in the rubber have two components: essentially radial stresses resulting from Sc and p and any additional external loading (these shear stresses can be kept reasonably small because of the high width-thickness ratio or stiffness of the rubber laminations); and tangential stresses resulting from the torsional strain applied due to rotation of the bearing-seal. The hydrostatic pressure on the outside of the circular laminate results in compressive circumferential hoop stresses in the metal layers, so that the bearing-seal is self-supporting against them, with Sc acting to prevent buckling of the metal laminations. The peak radial tensile stress in the metal laminations may be of the same order as Sc if metal and rubber layers are equally thick, and can otherwise be adjusted by proper selection of metal thickness relative to rubber thickness.

A typical small flat bearing-seal corresponding to FIG. 1 or 2 could have dimensions Do=2.062 in. and Di=1.000 in., and operate under a pressure differential p=10,000 psi. Sc is then calculated at 13,075 psi. Very thin laminations of unstiffened natural rubber and 100,000 psi-tensile cartridge brass (about 80 of each at 0.002" thick each) might be used, and could produce torsional stiffness of 9 lb./in. at the end of an 8 in. lever arm, readily moveable by hand through +/−15 degrees. Fatigue life is a consideration in establishing the limits of the applied oscillatory angles of motion and the number of life-cycles. Bearing-seals of these dimensions and loads have been oscillated at +/−15 degrees for almost two million cycles without sealing failure. Many more cycles would be expected with normally smaller angles or more layers to reduce the oscillatory torsional strain in the rubber, while fewer cycles are obtained with higher pressure.

Larger bearing-seals could maintain a large width-thickness ratio (265 in the example above) or could be made with stiffer rubber. Dimensions can be chosen according to known principles to provide adequate strength, prevent buckling, and to select overall torsional stiffness, taking into account the bearing thickness, normal forces, differential pressures, and the extent of movements.

Besides the configurations of FIGS. 1 and 2, it will be appreciated that other configurations of rubber-laminated bearings as taught by U.S. Pat. No. 2,900,182, and other means of external or integrally-preformed lateral support as taught in U.S. Pat. Nos. 3,228,673 and 3,083,065 respectively, may be used in a similar manner to accomplish similar objectives.

Figure 3:
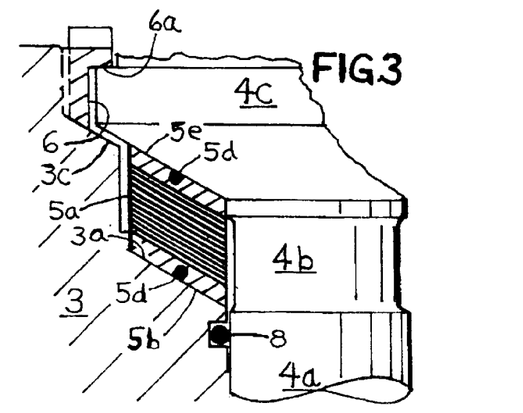
FIG. 3 is an alternate construction of an encircled part of FIG. 1 which shows a cross-section of a shallow-conic-configured bearing-seal assembly according to the invention.

The left half of a symmetric cross-section of a shallow conical bearing-seal is shown in FIG. 3 as an alternate construction of an encircled part of FIG. 1, with labels analogous to FIGS. 1 and 2. The conical shape of the laminations would provide the radial-centering action and internal support otherwise provided by one of the radial bearings or bushings 6 or 7 and the central plate 5c of FIGS. 1 and 2. However, the internal stresses developed in a conical bearing-seal would be higher than those for an otherwise similar flat bearing-seal under the same external pressure, the more so the greater the deviation from flatness. As a consequence, only shallow conical bearing-seals may be practical for high pressure conditions. Bearing-seals with laminations that are chevron-shaped in cross-section could also provide self-support.

Figure 4:
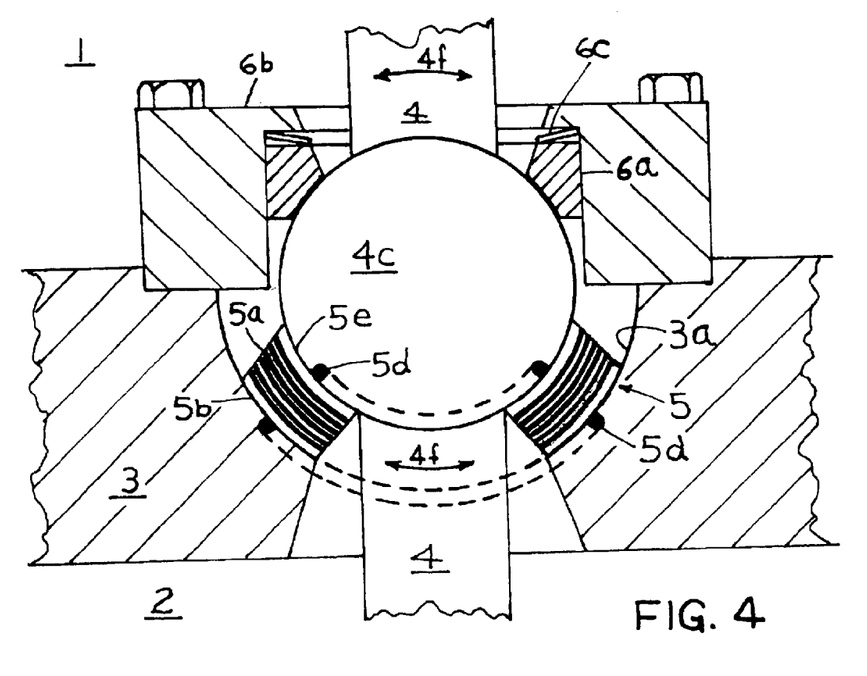
FIG. 4 is a cross-section of a cylindrically-configured bearing-seal assembly according to the invention.
Figure 5:
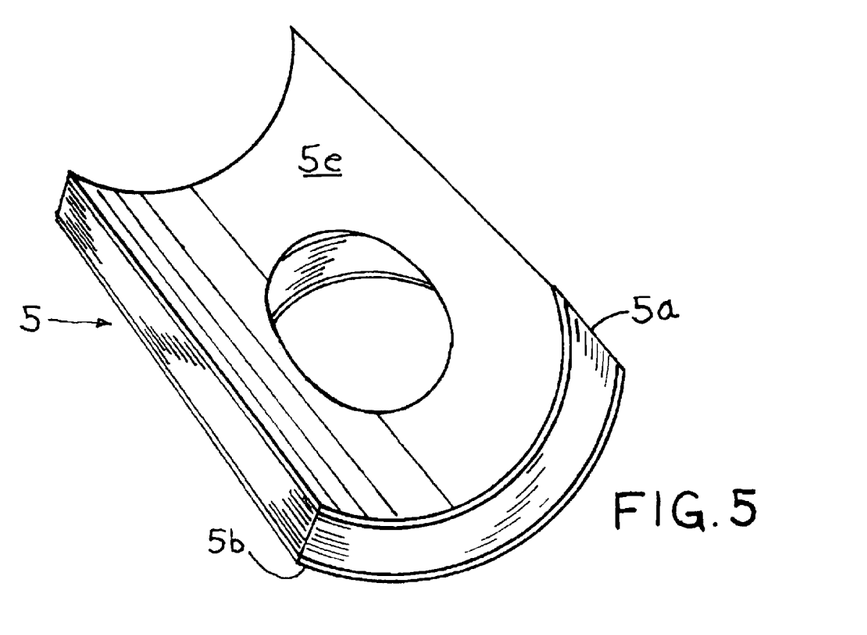
FIG. 5 is a perspective view of a cylindrically-configured bearing-seal according to the invention.

An assembly with another variation in shape is seen in FIG. 4 that uniquely does not permit any rotation about the longitudinal axis of the shaft, but rather oscillatory movement 4f about a transverse axis. It uses a laminate pad, ie, bearing-seal, with laminates that are truncated sections of concentric circular cylinders having a central aperture, as detailed in the perspective view of FIG. 5. The least and greatest radius layers are preferably thicker than the rest to form external load faces 5e and 5b respectively.

In the assembly, FIG. 4, the wall 3 separates the high pressure medium 1 from the low pressure medium 2 as before and has a hemi-cylindrical recess 3a with a through-aperture for the shaft 4, thereby forming a radially-inward annular flange in the wall to act as a load member and receptacle. The shaft extends on either side from a bulbous enlarged cylindrical central portion 4c having a transverse axis and providing the function of a flange as a load member. The bearing-seal 5 is fitted into recess 3a and supports the bottom load face of the transverse cylindrical portion 4c. Leakage between the shaft and the wall is prevented by the laminate, together with O-ring seals or equivalent 5d that encircle the shaft in grooves cut into the convex and concave cylindrical surfaces of 4c and said recess respectively, thereby sealing the load faces 5e and 5b against cross-flow. A conforming hemi-cylindrical cap 6a with an aperture is fitted as a bearing pad over the top surface of the shaft central portion 4c to hold it down while permitting 4c to move under it, and cap 6a in turn is supported and spring-loaded by a bracket 6b that is affixed to the wall 3. Cap 6a is thereby permitted to move slightly down under the force of the spring 6c, eg, of the Bellville type. This arrangement prevents upward motion of the shaft, while permitting slight vertical movements due to temperature expansion or contraction or load deflection of the bearing-seal 5. Although some lateral movement of the shaft along the axis of its cylindrical portion 4c might be permitted by clearances at the ends of said portion 4c relative to the ends of recess 3a, the primary rotational oscillatory movement allowable is indicated by the arrows 4f.

It is noted that the shaft of the FIG. 4 assembly passes through the bearing-seal aperture from one side of the wall to the other while its axis of revolution does not, ie, the longitudinal extent of the shaft is not substantially aligned with its axis of revolution.

Figure 6:
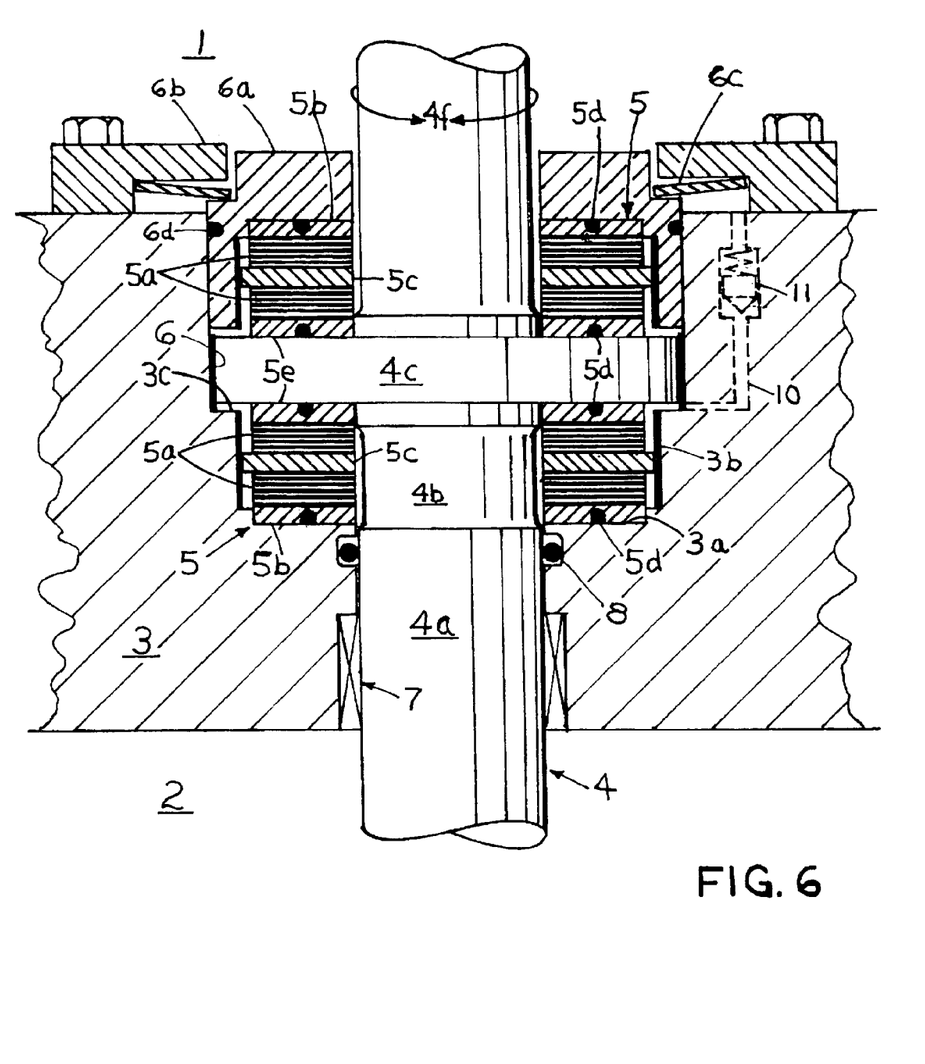
FIG. 6 is a cross-section of a double flat-configured bearing-seal assembly according to the invention.

Whereas all configurations according to the invention shown to this point have involved a single rubber-laminated bearing-seal, there are additional features available when two are employed. FIG. 6 indicates a double flat bearing-seal configuration. The bottom bearing-seal S has the same relation to the shaft flange 4c and the bearing housing recessed seat 3a as the single bearing-seal in FIGS. 1 and 2, and optionally retains the top and bottom radial bearings or bushings 6 and 7. The top bearing seal 5 has the same features in mirror opposition to those already discussed for the bottom bearing-seal and is mated in similar relation to the top face of the shaft flange 4c. Its top load face at 5b is mated to the downward oriented recessed face of a retainer sleeve 6a enclosed by the cylindrical bore of the cavity or housing in wall 3. A seal 6d, O-ring or equivalent, encircles the sleeve 6a to prevent ingress of pressurized fluid medium 1 past the clearance in this bore. A bolted hold-down plate 6b on the top of the housing applies a downward force on the sleeve 6a through suitable axial spring means such as the Bellville spring 6c, thereby compressively preloading both bearing-seals and sandwiching the flange 4c between them. It is essential that retainer sleeve 6a remain easily slidable within the housing bore so that slight axial movements due to thermal expansion or compression under load in the bearing-seals are not inhibited and so the top seal capability is maintained; anti-friction and anti-corrosion surface treatments to the bore and sleeve may be found desirable for that purpose.

Optional backup from an O-ring or equivalent seal 8 could be provided as before to further enhance sealing integrity. Angular stops on the shaft 4 are assumed as in FIGS. 1 and 2 but not shown, and keying of each bearing-seal to the shaft 4 and to the housing 3 by some means is also desirable. Although the top bearing-seal could be keyed to the housing directly, it could instead be done by using retainer sleeve 6a as an intermediate link; ie, keying the top plate 5b to 6a and that in turn to the housing.

The axial force upon the top bearing-seal depends upon the outside diameter Ds of the retainer sleeve 6a and the inside diameter Di of the bearing-seal, so the compressive stress on it is aproximately $$Sc=p((Ds^2-Di^2)/(Do^2-Di^2)),$$

ignoring the preload and the assumed small pressure between the two bearing-seals. The bottom bearing-seal, in serial loading relation to the top, would additionally see the pressure on the top of the shaft 4, so that its compressive stress would be given by the formula $$Sc=p(Ds^2/(Do^2-Di^2)),$$

again ignoring the assumed small effects of the low pressure side and the intervening pressure. It is desirable, in minimizing Sc on both bearings, to make Ds as small as possible.

Whereas the single bearing-seal 5 in FIG. 1 or 2 sees the high pressure on its periphery, the top bearing-seal in FIG. 6 will experience the high pressure in its aperture instead, and this will result in a different radial distribution of radial shear stresses in the rubber layers and create a component of hoop tension rather than compression in the metal layers. The bottom bearing of FIG. 6, however, would normally see no substantial pressure difference between its inside and outside.

Adding the top bearing-seal puts it in a serial primary sealing relation to the bottom bearing-seal. In case the intervening volume between the bearing-seals were filled with an essentially incompressible fluid, some sharing of the sealing function might occur, ie, each might share part of the total differential pressure. In the event of failure of the top seal function, the bottom bearing-seal would become the primary seal and it should function in the same manner and with the same loads as that of the single bearing-seal in FIG. 1 or 2.

Alternatively, to obtain smaller Sc on the bottom bearing-seal, for instance, the primary and secondary sealing roles could be reversed. That is, the bottom bearing-seal could be made the primary seal and the top the secondary seal by the provision of a small pressure-equalizing port shown schematically by dashed lines 10 from the high pressure medium 1 above the top seal to the intervening space occupied by the flange 4c, so that the latter space would experience the high pressure. This port would necessarily contain an appropriate overflow shutoff valve 11 such that if the bottom bearing-seal were to begin passing fluid, the high makeup flow through the port would cause it to be closed off, so that the pressure at flange 4c would drop to the low pressure and the top bearing-seal would then carry the pressure load and provide the seal (this scenario assumes the absence or ineffectiveness of a backup seal 8).

Double conical or chevron-shaped bearing-seal configurations could obviously be made in a fashion similar to the flat configuration of FIG. 6, while providing inherent radial centering as in FIG. 3. A combination of a flat bearing-seal and one of those two types could do the same. Moreover, double cylindrical configurations could be made by providing a top bearing-seal of the type in FIG. 5 together with the lower single cylindrical bearing-seal of FIG. 4.

Figure 7:
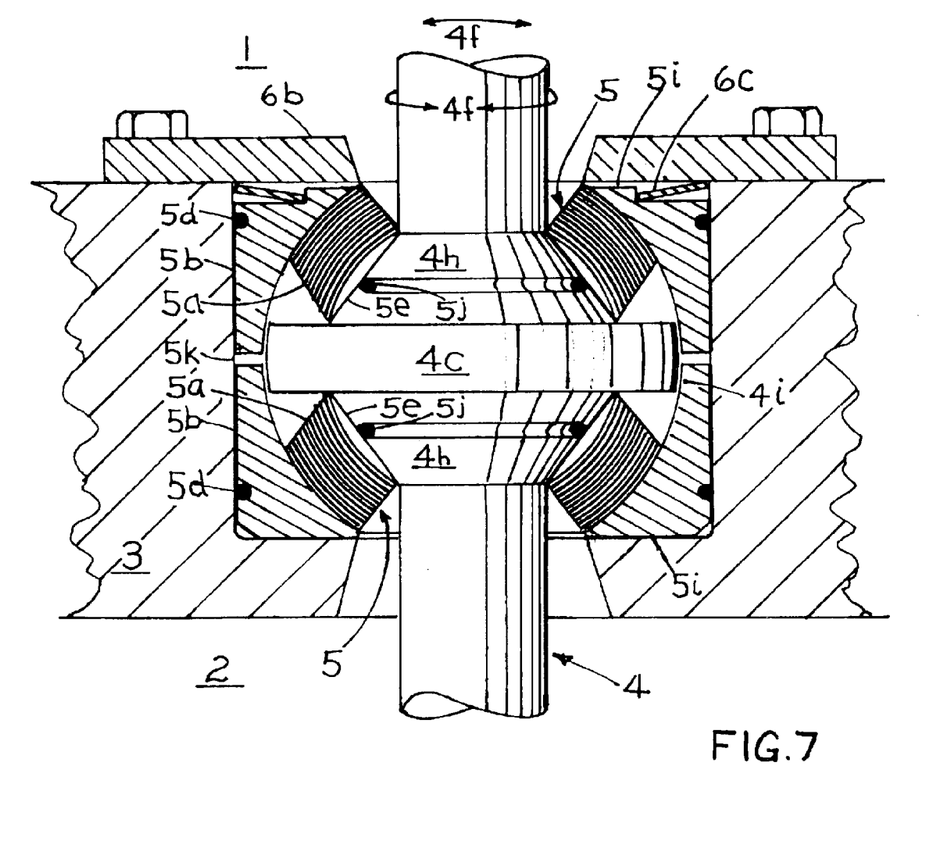
FIG. 7 is a cross-section of a double spherically-configured bearing-seal assembly according to the invention.

FIG. 7 represents a double spherical bearing-seal shaft-through-wall configuration that would uniquely permit not only limited rotation of a shaft 4 about its own axis, but also limited angular movement of the shaft about any axis. High and low pressure media 1 and 2 respectively are separated by the wall or hull of a pressure vessel 3 containing two spherical bearing-seals 5 (top) and 5 (bottom), which in turn surround, support and seal the shaft 4 (not sectioned) which penetrates from one side to the other of the wall through an aperture. The two spherical bearings each have a stack 5a of bonded rubber and metal laminations that are essentially segments of nested concentric spheres that have a common center point on the centerline of the shaft, and each has outer layer plates or fittings that adapt the laminate stack to the cooperating loading members. Relative to the latter outer layer fittings, rather than a separate conforming retainer sleeve (as seen at 6a in FIG. 6) to transfer thrust to the top bearing-seal, it is elected here for that function to be provided by a shell 5b that has a top load face 5i upon which the pressurized fluid medium 1 pushes, and it is bonded directly to the rest of the laminate stack. Thus for both top and bottom bearing-seals, 5b is a cylindrical metal shell that slips into the bore of the bearing housing 3 and has an inside spherical surface that defines an outer layer concentric and bonded to the underlying lamination of stack 5a. The shell 5b of the bottom bearing-seal is seated at 5i on an inwardly flanged flat receptacle with an aperture at the bottom of the bore. At the least radius of each laminate stack 5a, the other outer layer member of each bearing-seal is a metal shell 5e with a concentric spherical surface bonded to the laminate stack 5a, and its load face is made concave-conical to fit on a tapered load face 4h of the flange. (Otherwise, these tapered load faces could have been made spherical at 4h for contiguous support or even direct bonding to the least radius of the stacks 5a). O-rings 5d or equivalent seals are indicated around the outer shells 5b to seal against fluid flow through the bore at their respective locations. The bottom shell seal 5d also prevents flow of fluid relative to, with respect to, or across the mating load face with the seat at 5i. An O-ring or other seal could instead be arrayed at the mating load face with the seat as in FIG. 1. O-ring seals 5j or the like are also on the tapers 4h to seal against the shells 5e. A bolted-down retainer plate 6b together with an axial force spring 6c (eg, Bellville type) pushing down against the top load face 5i of top shell 5b is used to contain the bearing-seal assembly and provide a compressive preload upon it.

This configuration would sustain the differential pressure and provide a seal against passage of fluid from medium 1 to medium 2 because of the sealing capability primarily of the top bearing-seal and secondarily of the bottom bearing-seal. Obviously, the reversing of primary and secondary sealing roles by the small self-checking port shown in FIG. 6 could also be applied in this double bearing-seal configuration. The shaft apertures at top and bottom provide direct means for limitation of non-twisting angular motion. For the case of shaft twisting, anti-slip keying of shells 5b and 5e respectively to the wall 3 and shaft 4 and angular stops may be provided but are not shown.

The tapered sections 4h on both the top and bottom of the shaft flange expand into a central circular part 4c that extends radially toward, but with clearance gap 4i from, the inside spherical surfaces of shells 5b. Because of this small radial clearance, flange 4c provides a further backup safety function of maintaining the shaft essentially centered in the unlikely event that either bearing-seal should fail in a crushing mode. If that were to happen to the bottom bearing-seal, the pressure on the top bearing-seal would cause it and the shaft to move downwards somewhat until flange 4c jammed against the internal spherical surface of the outer shell 5b on the bottom. The clearance gap 5k between the top and bottom outer shells 5b should be large enough to permit this axial shift without closing up, or the top seal could be lost. However, this jamming event itself could have the beneficial effect of sealing between the flange 4c periphery and the inside surface of bottom shell 5b, especially if the materials of the two are relatively selected (or coated) to permit slight plastic deformation that could absorb any small gaps between them.

In a single bearing-seal variation, the top spherical bearing-seal 5a could be eliminated and replaced by a concentric half-ball surface on the shaft in place of the tapered section at 4h and a low-friction apertured socket acting upon it from above as an axial retainer similar in function to the threaded sleeve shoulder 6a of FIG. 1 or 2.

Figure 8:
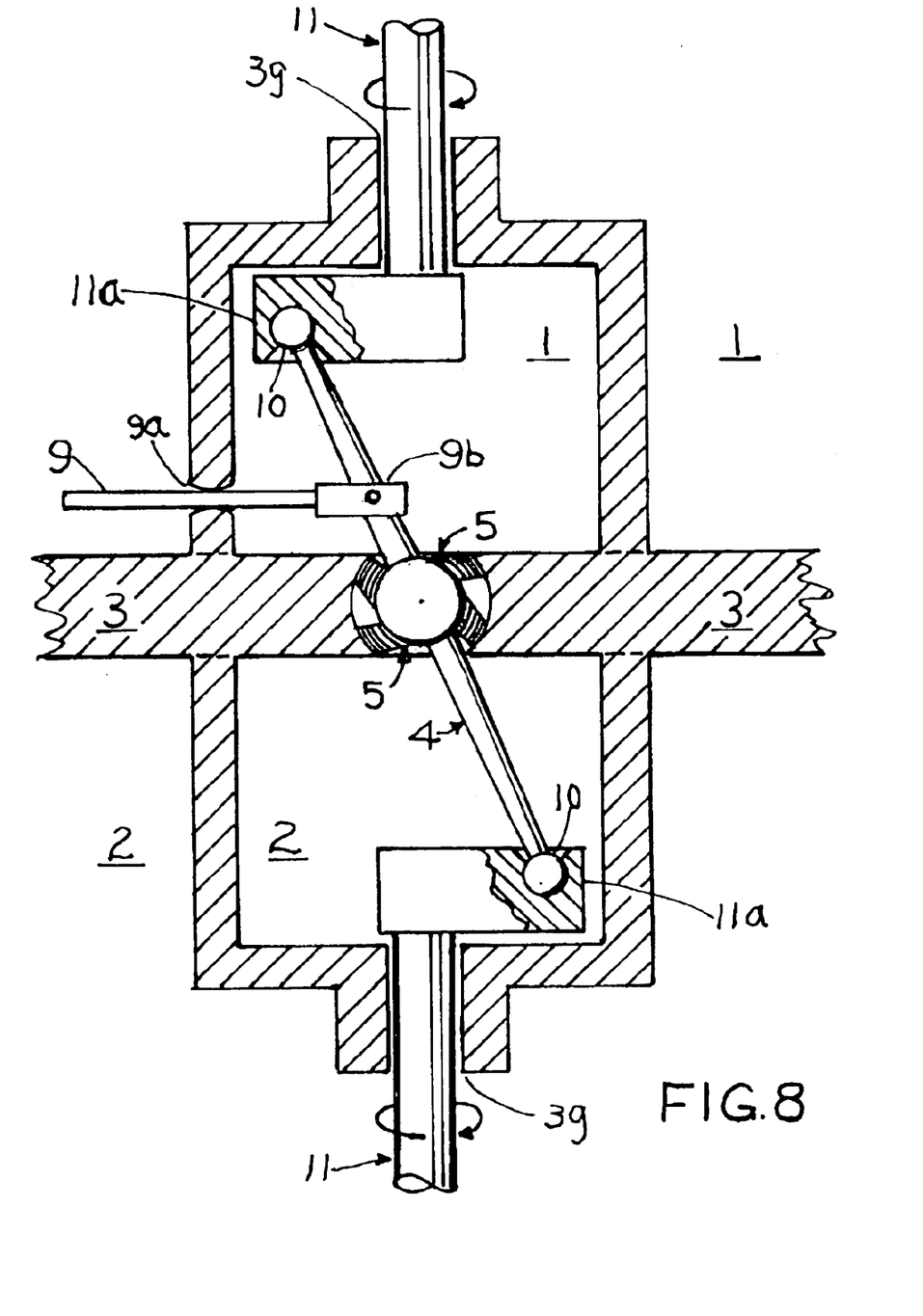
FIG. 8 is a cross-sectional schematic view of a spherically-configured bearing-seal assembly according to the invention with attachments arranged to provide a novel result.

FIG. 8 is a schematic cross-section view (except for the shafts) of an configuration that could transfer continuous rotation through the wall of a pressure vessel. As indicated, such a wall 3 separates two fluid media 1 and 2 that may have a substantial pressure difference between them. A spherical bearing assembly 5 is mounted through the wall as shown in FIG. 7 and has a shaft 4 that extends on both ends into the ball of a ball joint 10. A rigid structure is attached to the wall 3 on each side to support radial bearings 3g on axes that are colinear with the center of bearing-seal assembly 5. A crankshaft 11 is supported by the bearing 3g on each side of the wall and has a crank arm 11a oriented toward the wall in each case. Each crank arm further has a socket part of the joint 10 at an appropriate radius that accepts the ball end of shaft 4 to complete the ball joint. Obviously the roles of the ball and the socket could be interchanged without affecting functionality.

It can be seen that if continuous rotation is applied to the crankshaft on one side, it will cause circular but non-twisting motion to be imparted on that end of shaft 4, which, acting as a beam pivoting on the spherical bearing-seal 5 will cause the other crankshaft to rotate as well, but at 180 degrees relative to the first.

It is desirable to provide a restraint by means of a linkage attached on one end of shaft 4 to physically prevent it from twisting very far in case a ball joint should seize. One method of doing so is shown: a circular rod 9 extending loosely through a bushed hole 9a in the supporting structure on one side and having a fork or clevis end 9b pinned to shaft 4 so that the rod can pivot relative thereto while the ends of shaft 4 move in circles.

It will be understood that the embodiments described above are merely exemplary and that persons skilled in the art may make many variations and modifications without departing from the spirit and scope of the invention as defined in the appended claims.

I claim:

1. A shaft bearing-seal assembly comprising:

top and bottom bearing-seals, each having a laminate stack formed of a multiplicity of apertured flat or contoured alternate laminations of elastomeric and inelastic materials bonded or sealed together, and each having two opposed apertured outer layer members which each conform on an inner surface to one of the two opposed underlying laminations of said laminate stack and are bonded or sealed to the same, and each has first and second load faces that are each associated with one of said apertured outer layer members, to form an impervious unit having a periphery and an aperture associated respectively with the external and aperture edges of said laminations and outer layer members; and a wall of a pressure vessel, said wall having top and bottom sides and incorporating a radially inward load-supporting seat encircling an aperture through the wall; and a shaft having top and bottom ends and an enlargement in its mid-section that has top- and bottom—oriented load faces, and said bottom—oriented load face engages the first load face of said bottom bearing-seal, the aperture of which is penetrated by said shaft, and the bottom end of said shaft extends through the aperture in said wall so that said seat engages the second load face of said bottom bearing-seal, and the top end of said shaft extends through the aperture in said top bearing-seal so that the first load face of said top bearing-seal engages said top-oriented load face or said shaft enlargement; and sealing means between said shaft and the first outer layer member of said bottom bearing-seal and between said wall and the second outer layer member of said bottom bearing-seal, whereby complete sealing involving said bottom bearing-seal is established between said shaft and said wall; and sealing means between said shaft and the first outer layer member of said top bearing-seal and between said wall and the second outer layer member of said top bearing-seal, whereby complete sealing involving said top bearing-seal is established between said shaft and said wall; and top and bottom fluid media on the top and bottom sides of said wall, and their flow toward the other side of said wall is blocked by said complete sealing functions;

whereby complete sealing is established between said shaft and said wall against the flow of either said fluid medium toward the other despite substantial differential pressure between them and the possibility of failure of one said bearing-seal or its said sealing means, and said shaft can carry limited movement from a coupled mechanism on one side of said wall through to a coupled mechanism on the other side by means of shear strain in said elastomeric laminations.

2. The shaft bearing-seal assembly of claim 1 including retaining means that engage and bear downward upon the second load face of said top bearing-seal and are secured relative to said wall.

3. The shaft bearing-seal assembly of claim 1 wherein a small by-pass port normally provides direct connectivity of said top fluid medium from the aperture of said top bearing-seal to its periphery, but in case of failure of said bottom bearing-seal, said port will be closed off by the initial resulting flow of said top fluid medium through flow-sensitive stopping means within.

4. The shaft bearing-seal assembly of claim 1 wherein said laminations have shapes of truncated surfaces of planes, cones, spheres, or cylinders.

5. The shaft bearing-seal assembly of claim 1 wherein the lateral position of said shaft is limited by radial bearing means supported by said wall.

6. The shaft bearing-seal assembly of claim 1 wherein the extent of angular movement of said shaft is limited by stop means supported by and coacting between said shaft and said wall.

7. The shaft bearing-seal assembly of claim 1 wherein at least one interlockable structure is provided on said shaft or said wall and each said structure engages an associated complementally interlockable structure provided on at least one said outer layer member of said bearing-seals and restrains the same.

8. The shaft bearing-seal assembly of claim 1 wherein restraining means are implemented by complemental interlocking structures between said shaft or said wall and associated outer layer members of a said bearing-seal.

9. The shaft bearing-seal assembly of claim 1 wherein at least one backup seal is provided between said shaft and said wall, whereby if both said bearing-seals were to fail and permit said top fluid medium to flaw toward said backup seal, said flow would be blocked by said backup seal.

10. The shaft bearing-seal assembly of claim 1 wherein the means of sealing between said bearing-seal outer layer members and said shaft or wall includes at least one seal that encircles said shaft.

11. The shaft bearing-seal assembly of claim 1 wherein close-fitting stop means are provided to limit axial displacement of said shaft to a relatively small amount in the event of compressive failure of said bottom bearing-seal.

12. The shaft bearing-seal assembly of claim 11 wherein said stop means suffice also to prevent any flow of a fluid medium past said stop means.

13. The shaft bearing-seal assembly of claim 1 wherein said laminations have shapes of truncated surfaces of spheres to define spherical bearing-seals and said shaft extends on each end into one of the coacting parts of a ball and socket joint; and in addition, said assembly includes two crankshafts, each of which is rotatably supported by radial bearing means mounted upon a structure attached respectively onto each of the opposite sides of said wall, and said two crankshafts have a common axis of rotation that essentially contains the center of said at least one spherical bearing-seals, and said crankshafts have crank arms axially oriented toward said shaft ends and rotationally oriented at 180 degrees relative to one another and each incorporates at an appropriate radius the other coacting part of said ball and socket joint;

whereby each said crank arm links with one end of said shaft, such that rotation of either crankshaft causes said shaft ends to move in a circle and transfer that rotation continuously through said wall to the crank arm and crankshaft on the other side.

14. The shaft bearing-seal assembly of claim 13 wherein restraint is imposed upon said shaft to physically prevent it from twisting very far about its longitudinal axis in case one of said ball and socket joints should seize.

15. The shaft bearing-seal assembly of claim 1 wherein said bearing-seal assembly has an axis of revolution, and said axis is not substantially aligned with the longitudinal extent of said shaft.

16. The shaft bearing-seal assembly of claim 1 wherein said top and bottom fluid media are blocked by the respective top and bottom said complete sealing functions in normal operation, but in case of failure of a said complete sealing function, the other said complete sealing function will block said flow.

17. A shaft bearing-seal assembly comprising:

top and bottom bearing-seals, each having a laminate stack formed of a multiplicity of apertured flat or contoured alternate laminations of elastomeric and inelastic materials bonded or sealed together, and each having two opposed apertured outer layer members which each conform on an inner surface to one of the two opposed underlying laminations of said laminate stack and are bonded or sealed to the same, and each has first and second load faces that are each associated with one of said apertured outer layer members, to form an impervious unit having a periphery and an aperture associated respectively with the external and aperture edges of said laminations and outer layer members; and a shaft having top and bottom ends and an enlargement in its mid-section that has top and bottom oriented load faces, and each end of said shaft extends through the aperture of the respective said top or bottom bearing-seal so that each said enlargement load face engages the first load face of the respective said top or bottom bearing-seal, and a wall of a pressure vessel, said wall having top and bottom sides and incorporating a radially inward load-supporting seat encircling an aperture through the wall, and the bottom of said shaft extends through the aperture in said seat so that said seat engages the second load face of said bottom bearing-seal; and sealing means between said shaft and the first outer layer member of each said bearing-seal and between said wall and the second outer layer member of each said bearing-seal; and a fluid medium on the top side at said wall extending toward the aperture of said top bearing-seal in normal operation and serially extending beyond said aperture toward the periphery of said bottom bearing-seal in the event of failure of said too bearing-seal or its associated said sealing means; and a fluid medium on the bottom side of said wall extending toward the aperture of said bottom bearing-seal in normal operation and serially extending beyond said aperture toward the periphery of said top bearing-seal in the event of failure of said bottom bearing-seal or its associated said sealing means; and whereby complete sealing is established between said shaft and said wall against the flow of either said fluid medium toward the other despite substantial differential pressure between them and the possibility of failure of one said bearing-seal or its said sealing means, and said shaft can carry limited movement from a coupled mechanism on one side of said wail through to a coupled mechanism on the other side by means of shear strain in said elastomeric laminations.

18. A shaft bearing-seal assembly comprising:

top end bottom bearing-seals, each having a laminate stack formed of a multiplicity of apertured flat or contoured alternate laminations of elastomeric and inelastic materials bonded or sealed together, and each having two opposed apertured outer layer members which each conform on an inner surface to one of the two opposed underlying laminations of said laminate stack and are bonded or sealed to the same, and each has first and second load faces that are each associated with one of said apertured outer layer members, to form an impervious unit having a periphery and an aperture associated respectively with the external and aperture edges of said laminations and outer layer members; and a shaft having top and bottom ends and an enlargement in its mid-section that has top and bottom oriented load faces, each of which engages the first load face of the respective said top or bottom bearing-seal, said shaft penetrating the apertures of said bearing-seals; and apertured top and bottom members opposing each other, each having a load face that is engaged with the second load face of the respective said top or bottom bearing-seal therebetween, said shaft penetrating the apertures of said members, and said bottom member is a receptacle part of a wall of a pressure vessel, said wall having top and bottom sides, and said top member is part of top retaining means that restrain said shaft against upward axial movement; and means that seal between said shaft and the first outer layer members of said bearing-seals and between said wall and the second outer layer members of said bearing-seals; and a fluid medium on each side of said wall extending toward a bearing-seal aperture on the same side and potentially extending beyond said aperture toward the periphery of the other said bearing-seal in the event of failure of said same side bearing-seal or its associated said sealing means;

whereby the flow of either said fluid medium toward the other is prevented despite substantial differential pressure between them and the possibility of failure of one said bearing-seal or its said sealing means, and said shaft can carry limited movement from a coupled mechanism on one side of said wall through to a coupled mechanism on the other side by means of shear strain in said elastomeric laminations.

* * * * *